United States Patent
Bookbinder et al.

(10) Patent No.: US 6,767,579 B1
(45) Date of Patent: Jul. 27, 2004

(54) METHODS FOR PROTECTING SILICA-CONTAINING ARTICLE IN OPTICAL FIBER MANUFACTURING

(75) Inventors: Dana C. Bookbinder, Corning, NY (US); G. Scott Glaesemann, Corning, NY (US); William B. Mattingly, III, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/447,077

(22) Filed: Nov. 22, 1999

Related U.S. Application Data

(60) Provisional application No. 60/109,734, filed on Nov. 24, 1998.

(51) Int. Cl.[7] .............................. B05D 7/00; B05D 7/24; C03B 37/012; C03C 17/30; C03C 17/32
(52) U.S. Cl. ........................ 427/154; 427/162; 427/165; 65/385; 65/430; 65/432; 65/435
(58) Field of Search ................................ 427/154, 162, 427/163.2, 165, 166, 167, 168, 169, 226, 331, 336, 372.2, 384, 163.1, 164, 389.7; 65/385, 414, 417, 430, 432, 435, 426, 437; 385/123, 126, 128, 141, 145

(56) References Cited

U.S. PATENT DOCUMENTS

| | | | |
|---|---|---|---|
| 4,175,940 A | * 11/1979 | Siegmund | 65/408 |
| 4,218,294 A | * 8/1980 | Brack | 427/154 |
| 4,243,298 A | 1/1981 | Kao et al. | 350/96.33 |
| 4,473,599 A | * 9/1984 | Elion | 359/900 |
| 4,608,276 A | 8/1986 | Lamb et al. | 427/163 |
| 4,612,058 A | 9/1986 | Geke et al. | 134/38 |
| 4,632,848 A | * 12/1986 | Gosset et al. | 427/154 |
| 4,652,288 A | 3/1987 | Saito | 65/3.11 |
| 4,660,927 A | 4/1987 | Kondow et al. | 350/96.34 |
| 4,793,842 A | * 12/1988 | Yokota et al. | 65/397 |
| 4,889,400 A | 12/1989 | Pinson | 350/96.3 |
| 4,902,323 A | 2/1990 | Miller et al. | 65/3.11 |

(List continued on next page.)

FOREIGN PATENT DOCUMENTS

| | | | |
|---|---|---|---|
| DE | 28 53 873 A1 | * 7/1980 | |
| DE | 32 32 888 A1 | 3/1984 | |
| EP | 0 940 373 A2 | 9/1999 | |
| FR | 2 493 302 | 5/1982 | |
| GB | 2 152 494 | 8/1985 | |
| GB | 1050516 | 11/2000 | ......... C03B/37/027 |
| JP | 55-3369 | 1/1980 | ........... C03B/37/00 |
| JP | 57-205336 | 12/1982 | |
| JP | 58-213646 | 12/1983 | |
| JP | 62-91440 | 4/1987 | |
| JP | 02-258643 A | * 10/1990 | |
| JP | 2-258643 | 10/1990 | |
| JP | 04-065327 A | * 3/1992 | |
| JP | 7-128558 | 5/1995 | |
| JP | 9-142864 | 6/1997 | |

*Primary Examiner*—Shrive P. Beck
*Assistant Examiner*—Wesley D. Markham
(74) *Attorney, Agent, or Firm*—Randall S. Wayland; Robert L. Carlson

(57) ABSTRACT

A method of protecting a silica-containing article used in the manufacture of an optical fiber includes the step of applying to the silica-containing article a protective layer that facilitates removal of particulates that deposit on the protective layer and that ablates during or can be removed before subsequent processing of the silica-containing article. An intermediate product used in the manufacture of an optical fiber and protected against break-inducing particulates includes a silica-containing article, and a protective layer that facilitates removal of particulates that have deposited on the protective layer and that can be ablated during or removed before subsequent processing of the intermediate product.

20 Claims, 2 Drawing Sheets

U.S. PATENT DOCUMENTS

| | | | |
|---|---|---|---|
| 4,911,742 A | 3/1990 | Newbould et al. | 65/3.12 |
| 4,954,152 A | 9/1990 | Hsu et al. | 65/3.1 |
| 4,973,345 A * | 11/1990 | France | 204/192.11 |
| 5,093,880 A * | 3/1992 | Matsuda et al. | 385/100 |
| 5,309,543 A | 5/1994 | Artushenko et al. | 385/142 |
| 5,350,433 A | 9/1994 | Baniel | 65/388 |
| 5,444,808 A | 8/1995 | Shackleton et al. | 385/128 |
| 5,450,513 A | 9/1995 | Bookbinder et al. | 385/48 |
| 5,518,516 A | 5/1996 | Garnham | 65/382 |
| 5,534,748 A * | 7/1996 | Oomen | 252/582 |
| 5,609,924 A | 3/1997 | McCurdy et al. | 427/475 |
| 5,739,191 A * | 4/1998 | Woodhall et al. | 427/154 |
| 5,894,537 A | 4/1999 | Berkey et al. | 385/123 |
| 6,124,044 A * | 9/2000 | Swidler | 428/500 |
| 6,189,341 B1 * | 2/2001 | Draper | 65/404 |
| 6,211,282 B1 * | 4/2001 | Yamashita et al. | 524/501 |
| 6,233,972 B1 * | 5/2001 | Foster et al. | 65/60.3 |
| 6,273,990 B1 | 8/2001 | Bookbinder et al. | 156/344 |
| 6,379,448 B1 * | 4/2002 | Sirejacob | 106/287.12 |
| 6,379,746 B1 | 4/2002 | Birch et al. | 427/154 |

* cited by examiner

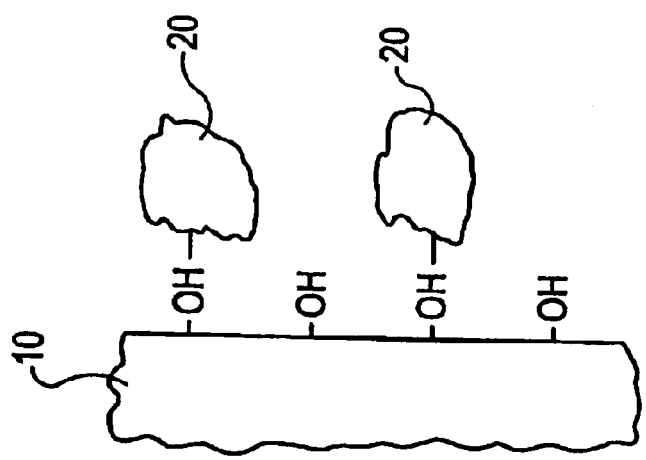

METHODS FOR PROTECTING SILICA-CONTAINING ARTICLE IN OPTICAL FIBER MANUFACTURING

RELATED APPLICATIONS

This application claims the benefit of U.S. Provisional Application No. 60/109,734, filed Nov. 24, 1998.

BACKGROUND OF THE INVENTION

1. Field of the Invention

The present invention relates to a method of protecting a silica-containing article used in the manufacture of an optical fiber, a method of inhibiting breaks during drawing of an optical fiber, and an intermediate product used in the manufacture of an optical fiber and protected against break-inducing particulates.

2. Description of the Related Art

An optical fiber is typically formed by drawing the optical fiber from a fiber preform heated to a high temperature. The fiber preform can be formed by a variety of processes. One such process, which is known as the outside vapor deposition process, is performed by applying silica soot to an alumina bait rod to establish a core profile, consolidating the core profile to create a glass core blank, and drawing the core blank to a smaller diameter to create a glass core cane. The core cane is then coated with soot, which is consolidated to create the fiber preform. Other processes, such as modified vapor deposition (MCVD) or plasma-activated chemical vapor deposition (PCVD), known generally as inside vapor deposition processes, are performed by depositing silica on the inside of a solid glass tube. The solid glass tube with the deposit is then collapsed to form a glass core blank, and glass is added to the outside of the core blank to form a fiber preform from which the optical fiber is drawn. Alternatively, the solid glass tube with the deposit can be collapsed to directly form a fiber preform. Still another process employed to make a preform for drawing optical fiber is the vapor axial deposition (VAD) process. The present invention has applicability in at least all of these various vapor deposition techniques.

As used herein, the term fiber preform shall refer to an article from which a fiber can be drawn without having to add more silica-containing glass. Core blank and core cane shall be used to refer to articles that include at least part of (but not necessarily all of) the optical core of the resultant fiber. A core cane is a core blank which has been consolidated and drawn into a smaller diameter, intermediate product. Thus, in some manufacturing operations, a core blank (or core cane) may be formed, after which additional core and/or clad glass material will be added to the core blank (or core cane) to form a fiber preform.

During drawing of an optical fiber from a fiber preform, the optical fiber often will break. The reduction of breaks during drawing of optical fiber is a clear goal in the industry, especially since customers now request lengths of optical fiber greater than fifty kilometers.

Fiber breaks are believed to be caused at least in part by inorganic foreign particulates (e.g., $ZrO_2$) that deposit on glass surfaces of intermediate products, such as the fiber preform, core blank, core cane, and glass tube, produced during the formation of the optical fiber. These glass surfaces are reactive and can form irreversible bonds with the inorganic particulates. As shown schematically in FIG. 2, inorganic particulates 20 bond with active sites, such as OH groups, on a glass surface 10 and become part of the glass surface 10. Therefore, the particulates cannot be readily removed during standard cleaning before fiber draw. These particulates cause structural failure during fiber draw. For example, inorganic particulates on the glass surface of the fiber preform, core blank, core cane, or the glass tube, are believed to be a main cause of external fiber breaks, which occur during the draw process. Inorganic particulates on the glass surfaces of the core blank, core cane, and glass rube are believed to sometimes cause fiber internal breaks.

The inorganic particulates are present in the environment of the manufacturing plant. In addition to merely falling unaided onto the glass surfaces of the intermediate products, the particulates may be attracted to the glass surfaces by static charge. Ironically, a static charge often develops due to efforts to clean the glass surfaces.

Particulates can be removed from the glass surfaces of the intermediate products by using hydrofluoric acid as a cleaning agent. Hydrofluoric acid, however, changes the dimensions of the intermediate product because it etches the glass surface. Hydrofluoric acid is also expensive to use because it is toxic. Thus, hydrofluoric-acid cleaning is not a desirable technique for reducing fiber breaks.

It might be possible to reduce fiber breaks by manufacturing in a clean room so that there are almost no particulates to deposit on the glass surfaces of the intermediate products. This, however, would not be cost efficient.

SUMMARY OF THE INVENTION

As embodied and broadly described herein, the invention comprises a method of protecting a silica-containing article used in the manufacture of an optical fiber and thereby inhibiting breaks during drawing of an optical fiber. The method includes the steps of providing a silica-containing article used in the manufacture of an optical fiber, and applying a protective layer to the silica-containing article. The article could be for example, a core blank, a core cane, a fiber preform, a glass tube used in an inside vapor deposition process, a sleeve tube used to build up the glass exterior to the core glass, or any other silica-containing article. Preferably, the silica-containing article is a glass (as opposed to unconsolidated silica soot) when the protective layer is applied.

The invention also comprises an intermediate product used in the manufacture of an optical fiber and protected against break-inducing particulates. The intermediate product includes a silica-containing article, and a protective layer.

It is to be understood that the foregoing general description and the following detailed description are exemplary and explanatory only and are not restrictive of the invention as claimed.

BRIEF DESCRIPTION OF THE DRAWINGS

The accompanying drawings, which are hereby incorporated by reference, illustrate an embodiment of the invention and together with the description serve to explain the principles of the invention.

FIG. 2 shows a partial schematic, cross-sectional view of an uncoated glass surface subjected to inorganic particulates in the environment.

DETAILED DESCRIPTION OF THE PREFERRED EMBODIMENTS

Figure 1:
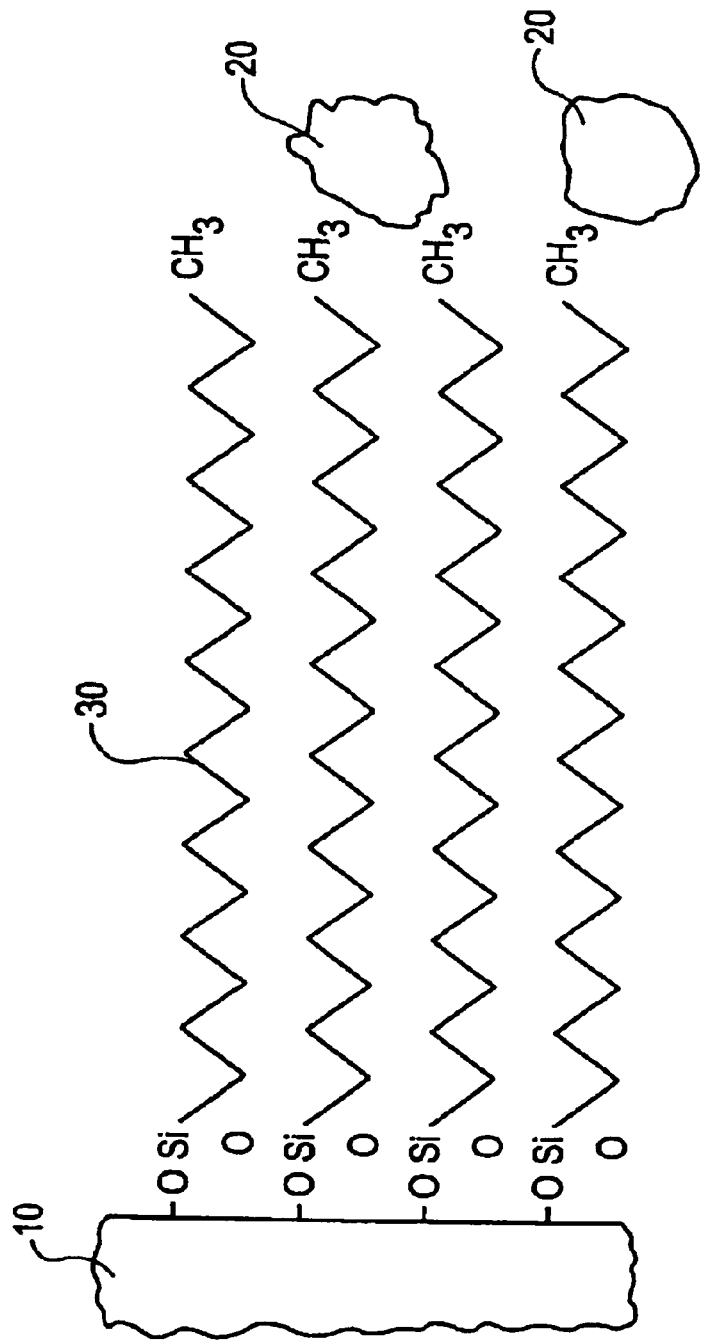
FIG. 1 shows a partial schematic, cross-sectional view of a glass surface coated with a preferred protective layer according to an embodiment of the present invention.

Reference will now be made in detail to the presently preferred embodiments of the invention.

It has been determined that fiber breaks during the drawing of optical fiber can be reduced by applying a protective layer to various silica-containing articles which are made during the course of manufacturing an optical fiber. For example, such a protective layer can be applied to a surface of a silica-containing fiber preform from which the optical fiber is drawn. Preferably, the silica-containing article is a silicate based glass article such as an optical fiber preform or a glass article for use in making a optical fiber preform. Such glass articles are typically comprised of a core region consisting of silica doped with an index of refraction altering dopant, such as germania or fluorine, and the core is surrounded by a cladding which typically consists of silica or fluorine doped silica. The protective layer protects the silica-containing article from break-inducing particulates, such as inorganic particulates, and facilitates removal of those particulates prior to drawing of the optical fiber or further processing. Additionally, the protective layer preferably ablates during drawing of the optical fiber or further processing, so that it does not affect the optical properties of the optical fiber. Alternatively, the protective layer could be otherwise removed before or during the draw operation or further processing. The protective layer is preferably applied to any glass surface which will see an atmosphere in which it might come in contact with inorganic particulates. The protective layer is preferably applied to a consolidated, or sintered glass surface, as opposed to an unconsolidated glass soot.

In particular, the protective layer can be applied to the fiber preform after the fiber preform is formed. The number of particulates that deposit on the fiber preform can be minimized by applying the protective layer to the fiber preform as soon as possible after it is formed. Just before drawing the optical fiber from the fiber preform, these break-inducing particulates can be removed from the protective layer on the fiber preform by, for example, wiping them off with a conventional clean room wipe containing isopropyl alcohol, blowing them off with super critical $CO_2$, or rinsing them off with a liquid such as water, or any other cleaning method suitable for removing the particulates. Thus, the particulates will not be present on the fiber preform during drawing of an optical fiber and, therefore, will not be break sources in the optical fiber.

The protective layer preferably facilitates removal of the particulates by preventing bonding of the particulates to the glass surface of the fiber preform. In particular, it is believed that the protective layer preferably bonds to active sites on the glass surface due to, for example, a covalent bond, an ionic bond, or a bond due to van der Waal forces. As shown in FIG. 1, since a protective layer 30 bonds to active sites on a glass surface 10, inorganic particulates 20 merely rest on the protective layer 30 and do not bond to the active sites. The active sites can include, for example, groups that will form a $SiMO_x$, compound, where M is a metal. Examples of groups that will form such a $SiMO_x$ compound include OH, SiOH, and GeOH groups.

The protective layer preferably can be at least partially removed from the fiber preform before fiber draw. For example, the protective layer can be made in the form of a water soluble polymer such as polyvinyl alcohol or hydroxymethylcellulose, which can be removed from the fiber preform by washing the fiber preform with water or another suitable solvent which removes the protective layer.

Alternatively, in a preferred embodiment, the protective layer ablates during drawing of the optical fiber from the fiber preform. Consequently, in the case of a fiber preform, there is no need to remove the protective layer before inserting the preform into the draw furnace. The protective layer should burn off early enough in the drawing process that it does not become an integral part of the optical fiber. The temperature of the furnace during drawing is typically 1400° C. to 2000° C. The protective layer preferably ablates below 900° C. and, more preferably, below 500° C. (most polymers should burn off below 500° C., but carbon will burn off between 600–900° C.).

The protective layer preferably leaves essentially no detrimental inorganic residue after ablating. As used herein, the term detrimental inorganic residue refers to residue that will act as break sources. Such inorganic residue will often not dissolve into the glass and instead forms part of the glass structure. It is further preferred that the protective layer does not leave an organic residue or a carbon containing species.

It is also preferred that the protective layer prevent the build up of static on the fiber preform. This prevents particulates from being attracted to the fiber preform.

Many materials will provide a protective layer that satisfies the above-stated desirable criteria of facilitating removal of inorganic particulates and ablating during drawing of an optical fiber. Many of these materials also provide the additional desirable characteristics stated above.

For example, many organic materials satisfy the preferred criteria stated above for the protective layer. In particular, organic materials that form a self-assembled monolayer on the silica-containing article are presently preferred. Organic materials of this type preferably have a hydrocarbon or fluorocarbon functionality and include silane monomers or oligomers. Examples include hydrocarbon silanes, fluorocarbon silanes, epoxy functional silanes, acrylate functional silanes, amine functional silanes, thiol functional silanes, phenyl functional silanes, and any combination of the above. Hydrocarbon silane (e.g., $C_{18}H_{37}$—$Si(OR)_3$) and fluorocarbon silane (e.g., $C_{3-10}F_n$—$CH_2CH_2$—$Si(OR)_3$) are specific examples of organic materials that each meet the preferred requirements stated above.

Other examples of organic protective layers include alkyl and aryl ammonium compounds, e.g. $C_{18}H_{37}N(CH_3)_3Cl$ or $C_{17}H_{35}CO_2Na$. The former is presently preferred when the glass is negatively charged, whereas the latter is preferred when the glass is positively charged.

Other organic protective layers can bond to the glass via Van der Waal forces. Such examples include acrylate polymers, polyvinyl alcohol and waxes such as ethylenebissteramide.

Organic material can be applied to the fiber preform by, for example, mixing the organic material with deionized water or another suitable solvent such as isoproponal or acetone for the organic material and spraying or wiping the solution onto the fiber preform or dipping the fiber preform into the solution. Preferably, the solution contains 0.01% to 2% of the organic material.

Certain polymers will also satisfy the criteria stated above for the protective layer. Such polymers include water soluble polymers such as polyvinyl alcohol or hydroxymethyl cellulose; thermoplastic polymers such as polybutylmethacrylate; latex based polymers such as crosslinked polybutylmethacrylate latex dispersion in water; thermoset polymers such as epoxy or urethane; UV curable polymers such as acrylates and epoxies.

These polymers can be applied by various technologies such as, first dissolving the polymers or monomers in water, as in the case of polyvinylalcohol or hydroxy methylcellulose; or in a suitable organic solvent, such as acetone in the case of polybutylmethacrylate; or by applying the epoxy, urethane or acrylate monomers or oligomers to the glass surface and subsequently curing these materials via heat or UV light.

Additionally, carbon will satisfy the criteria stated above for the protective layer, particularly for the fiber preform. Carbon can be applied to the fiber preform by conventional techniques, such as vapor deposition. For example, methane, acetylene, or other carbon compounds can be decomposed by heating in an inert atmosphere to cause carbon to deposit on the glass surface of the fiber preform.

The following example illustrates an advantage of the invention.

EXAMPLE 1

A C18-hydrocarbon silane (HC-silane) coating (DuPont, TLF-8291) was prepared as 1% solution in water. Several fiber preforms were coated, then allowed to stand in a plant environment for several hours. The fiber preforms were then wiped with a clean room cloth containing isopropyl alcohol before being drawn into optical fiber.

The cloth containing isopropyl alcohol only removed the dirt that attached to the protective layer during exposure to the plant atmosphere. The cloth containing isopropyl alcohol did not remove the silane protective layer. Instead, the silane layer ablated during the fiber draw process due to the high temperatures employed. TOF-SIMS analysis performed on the fiber indicated residual silane left on the drawn fiber product, and no deleterious effects were seen on the properties of the fiber due to using this protective coating process. On the other hand, using the protective silane coatings described above, break rates were significantly reduced compared to break rates normally expected with this type of fiber.

For ease of explanation, the present invention has been described with reference to providing a protective layer on a fiber preform to form an intermediate product protected against break-inducing particulates. A protective layer, however, can also be provided on other silica-containing articles used in the manufacture of optical fibers, to form intermediate products protected against break-inducing particulates. For example, the silica-containing article could be a core cane and/or a core blank used in an outside vapor deposition process. As an additional example, the silica-containing article could be a glass tube used in an inside vapor deposition process.

In each of these instances, the protective layer is preferably applied to a consolidated or sintered (as opposed to soot) glass surface on the silica-containing article, in an amount sufficient to provide a coating which is sufficiently continuous that it protects the article against particulates which would otherwise become potential sources of fiber breaks during the fiber draw process. These protective layers are preferably at least applied onto areas which are critical to preventing breaks caused by foreign particulates. An example of such a critical area is the area on a core cane onto which additional core or clad glass or glass soot is to be added. By employing a protective layer which completely or substantially covers at least the critical areas of the silica containing article, breaks due to inorganic particulates coming in contact with the silica-containing article can be reduced substantially.

The protective layer can be removed from these additional intermediate products via techniques similar to those set forth above for the fiber preform, e.g., they may be removed partially or completely prior to further processing using a solvent. Alternatively, in a preferred embodiment which employs the same silane employed in Example 1 above to protect a glass core cane, the material ablates during deposition of additional core or clad glass soot via an outside vapor deposition process.

The protective layer applied to these silica-containing articles preferably meets the criteria stated above in regard to the protective layer for the fiber preform. The point in the manufacturing process at which the protective layer ablates or is removed from these silica-containing articles may differ.

For example, if a protective layer applied to a silica-containing article other than a fiber preform is intended to ablate, it preferably ablates before drawing of the optical fiber and, more preferably, ablates during subsequent processing of the article. For example, in an outside vapor deposition process, it would be advantageous for a protective layer on a core blank to ablate during drawing of the core blank into a core cane. Likewise, it would be advantageous for a protective layer on a core cane to ablate during the deposition of soot on the core cane. The protective coatings described herein exhibit excellent utility in protecting core cane or other intermediate glass articles before additional glass soot is added to such articles. In such embodiments, the protective coating may be applied onto a glass core cane to protect the core cane until the core cane is to be further processed. Then, when additional soot material is added onto the core cane, the core cane is preferably first heated to remove the organic protective coating, after which additional glass soot is deposited onto the core cane. With regard to the inside vapor deposition process, as a further example, it would be advantageous for a protective layer on a glass tube to ablate during fire polishing or other tube preparatory steps employed just prior to deposition, or just as the first layer of additional soot is being deposited.

Likewise, if a protective layer is intended to be removed from a core blank, core cane, or glass tube, it preferably is removed before or during subsequent processing, such as redraw or the deposition of additional soot.

It will be apparent to those skilled in the art that various modifications and variations can be made in the above-described embodiments of the present invention without departing from the scope or spirit of the invention. It is intended that the specification and examples be considered as exemplary only, with a true scope and spirit of the invention being indicated by the following claims.

What is claimed is:

1. A method of protecting a silica-containing article used in the manufacture of an optical fiber, the method comprising the steps of:

providing a silica-containing article used in the manufacture of an optical fiber;

applying a protective organic layer to the silica-containing article;

removing, by cleaning, particulates from the protective layer; and ablating by heating the protective layer during subsequent processing of the silica-containing article.

2. The method of claim 1, wherein the protective layer is applied to a consolidated glass surface.

3. The method of claim 2, wherein the protective layer leaves essentially no detrimental inorganic residue after the step of ablating.

4. The method of claim 2, wherein the step of removing particulates is accomplished by wiping with a substrate containing isopropyl alcohol;

blowing with super critical $CO_2$; or rinsing in liquid water.

5. The method of claim 2, wherein the silica-containing article includes one of a core cane and a core blank used in an outside vapor deposition process.

6. The method of claim 2, wherein the silica-containing article includes a glass tube used in an inside vapor deposition process.

7. The method of claim 2, wherein the silica-containing article is a fiber preform from which an optical fiber can be drawn and the protective layer is applied directly onto the fiber preform.

8. The method of claim 7, further comprising the step of drawing an optical fiber from the fiber preform.

9. The method of claim 8, wherein the protective layer ablates during drawing of an optical fiber from the fiber preform.

10. The method of claim 9, wherein the protective layer leaves essentially no detrimental inorganic residue after ablating.

11. The method of claim 7, wherein the organic material forms a self-assembled monolayer on the fiber preform.

12. The method of claim 7, wherein the fiber preform is formed by adding additional soot materials by an outside vapor deposition process onto a core cane and a core blank, the method further comprising the steps of applying a protective layer to at least one of the core cane and the core blank and removing particulates from the protective layer on the at least one of the core cane and the core blank prior to the step of ablating.

13. The method of claim 7, wherein the fiber preform is formed by an inside vapor deposition process from a silica-containing tube, the method further comprising the steps of applying a protective layer to the silica-containing tube and removing particulates from the protective layer on the silica-containing tube prior to the step of ablating.

14. The method of claim 1, wherein the protective layer includes at least one of a water soluble polymer, a thermoplastic polymer, a latex based polymer, a thermoset polymer, and a UV curable polymer.

15. The method of claim 1, wherein the organic material forms a self-assembled monolayer on the silica-containing article.

16. The method of claim 1, wherein the organic material includes at least one of hydrocarbon silane, fluorocarbon silane, epoxy functional silanes, acrylate functional silane, amine functional silane, thiol functional silane, phenyl functional silane, an alkyl and aryl ammonium compound, acrylate polymer, polyvinyl alcohol, and a wax.

17. A method of protecting a silica-containing article used in the manufacture of an optical fiber, the method comprising the steps of:

providing a silica-containing article used in the manufacture of an optical fiber; and applying a protective layer consisting essentially of a silane to a consolidated glass surface of the silica-containing article.

18. The method of claim 17, wherein the silane includes at least one of a hydrocarbon silane and a fluorocarbon silane.

19. The method of claim 17, wherein the silane includes at least one of epoxy functional silanes, acrylate functional silane, amine functional silane, thiol functional silane, and phenyl functional silane.

20. A method of protecting a silica-containing preform used in the manufacture of an optical fiber, the method comprising the steps of:

providing a silica-containing preform used in the manufacture of an optical fiber;

applying a protective organic layer to the silica-containing preform;

removing, by cleaning, particulates from the protective layer; and ablating by heating protective layer during subsequent drawing of the silica-containing preform.

* * * * *